United States Patent
Ha et al.

(10) Patent No.: US 9,696,588 B2
(45) Date of Patent: *Jul. 4, 2017

(54) DISPLAY DEVICE

(71) Applicant: Samsung Display Co., Ltd., Yongin, Gyeonggi-Do (KR)

(72) Inventors: Juhwa Ha, Asan-si (KR); Seong-Yong Hwang, Asan-si (KR); Dohun Kim, Masan-si (KR); Young-Min Park, Hwaseong-si (KR); Yongkyu Kang, Yongin-si (KR); Byung-Seo Yoon, Hwaseong-si (KR); Juyoun Son, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,787

(22) Filed: Apr. 13, 2016

(65) Prior Publication Data
US 2016/0223868 A1 Aug. 4, 2016

Related U.S. Application Data

(63) Continuation of application No. 14/146,092, filed on Jan. 2, 2014, now Pat. No. 9,347,651.

(30) Foreign Application Priority Data

Jul. 31, 2013 (KR) .......................... 10-2013-0090999

(51) Int. Cl.
*G02F 1/1335* (2006.01)
*F21V 13/02* (2006.01)

(52) U.S. Cl.
CPC ........ *G02F 1/133611* (2013.01); *F21V 13/02* (2013.01); *G02F 1/133603* (2013.01); *G02F 1/133605* (2013.01); *G02F 1/133606* (2013.01)

(58) Field of Classification Search
CPC ......... G02F 1/133611; G02F 1/133605; G02F 1/133606; G02F 1/133603; F21V 13/02
See application file for complete search history.

(56) References Cited

U.S. PATENT DOCUMENTS 6,271,901 B1 8/2001 Ide et al.
6,543,903 B2 4/2003 Akimoto et al.
(Continued)

FOREIGN PATENT DOCUMENTS

JP 2003-014911 A 1/2003
JP 2004-253763 A 9/2004
(Continued)

*Primary Examiner* — David V Bruce
(74) *Attorney, Agent, or Firm* — Cantor Colburn LLP

(57) ABSTRACT

A display device includes an optical member, a display panel disposed on the optical member, and a plurality of light emitting units disposed under the optical member, the optical member comprising, a diffusion layer, and a reflectivity control layer which is disposed under the diffusion layer and reflects a light provided from the light emitting units, including a first base material, reflective materials dispersed in the first base material, a plurality of first portions corresponding to the plurality of light emitting units, and a second portion disposed adjacent to the first portions, where each of the plurality of first portions comprises a greater amount of the reflective materials than the second portion, when a first portion and a second portion represent a unit area having a predetermined size.

20 Claims, 12 Drawing Sheets

(56) References Cited

U.S. PATENT DOCUMENTS

| | | | |
|---|---|---|---|
| 9,347,651 B2* | 5/2016 | Ha | F21V 13/02 |
| 2004/0115352 A1 | 6/2004 | Schultheis et al. | |
| 2006/0176429 A1 | 8/2006 | Watchi et al. | |
| 2010/0247901 A1 | 9/2010 | Hsieh | |
| 2011/0018017 A1 | 1/2011 | Bierhuizen et al. | |
| 2011/0095970 A1* | 4/2011 | Yoo | G02B 6/003 |
| | | | 345/102 |
| 2012/0113158 A1* | 5/2012 | Goto | G02B 6/0038 |
| | | | 345/690 |
| 2012/0314275 A1 | 12/2012 | Hung et al. | |
| 2013/0025671 A1 | 1/2013 | Lim et al. | |
| 2013/0028948 A1 | 1/2013 | Yamamoto et al. | |

FOREIGN PATENT DOCUMENTS

| | | |
|---|---|---|
| JP | 2005-070253 A | 3/2005 |
| JP | 2005-121858 A | 5/2005 |
| JP | 2008-083378 A | 4/2008 |
| JP | 2010-156930 A | 7/2010 |
| JP | 2012-221732 A | 11/2012 |
| KR | 1020010005640 A | 1/2001 |
| KR | 1020070059282 A | 6/2007 |
| KR | 1020100003486 A | 1/2010 |
| KR | 1020110025412 A | 3/2011 |
| KR | 1020110051532 A | 5/2011 |
| KR | 1020110062074 A | 6/2011 |
| KR | 1020110104398 A | 9/2011 |
| KR | 1020120003280 A | 1/2012 |
| KR | 1020120029140 A | 3/2012 |
| KR | 1020130023564 A | 3/2013 |

* cited by examiner

DISPLAY DEVICE

This application is a continuation of U.S. patent application Ser. No. 14/146,092, filed on Jan. 2, 2014, which claims priority to Korean Patent Application No. 10-2013-0090999, filed on Jul. 31, 2013, and all the benefits accruing therefrom under 35 U.S.C. §119, the contents of which are hereby incorporated by reference in its entirety.

BACKGROUND

1. Field

The invention relates to a display device. More particularly, the invention relates to a display device having improved display quality.

2. Description of the Related Art

In a non-self emissive display device, such as a liquid crystal display, a display panel that displays an image is not self-emissive. Accordingly, the non-self emissive display device displays the image using a light provided from a backlight unit. The backlight unit includes light emitting units to emit the light. Each light emitting unit includes plural light emitting devices.

The non-self emissive display device generally includes an optical member to improve properties of the light from the light emitting units. The optical member is disposed under the display panel.

SUMMARY

The invention provides a display device providing uniform brightness of light to a display panel thereof.

Exemplary embodiments of the invention provide a display device including an optical member, a display panel, and a plurality of light emitting units. The display panel is disposed on the optical member and the plurality of light emitting units is disposed under the optical member.

The optical member includes a diffusion layer and a reflectivity control layer disposed under the diffusion layer. The reflectivity control layer includes a first base material and reflective materials dispersed in the first base material to reflect a light provided from the plurality of light emitting units.

The reflectivity control layer includes a plurality of first portions corresponding to the plurality of light emitting units and a second portion disposed adjacent to the plurality of first portions.

In an exemplary embodiment, each of the plurality of first portions may include a greater amount of the reflective materials than the second portion when the first and second portions respectively represent a unit area having a predetermined size.

In an exemplary embodiment, each of the plurality of first portions of the reflectivity control layer may have a thickness greater than a thickness of the second portion of the reflectivity control layer.

In an exemplary embodiment, each of the plurality of first portions may include convex patterns and the second portion includes concave patterns.

In an exemplary embodiment, the reflectivity control layer may include at least one of titanium dioxide and barium sulfate and the diffusion layer includes silicon dioxide.

In an exemplary embodiment, the reflectivity control layer may further include color compensation materials having a light absorptance higher than the reflective materials in a long wavelength range and lower than the reflective materials in a short wavelength range.

In an exemplary embodiment, the optical member may further include a color compensation layer including color compensation materials with a light absorptance higher than the reflective materials in a long wavelength range and lower than the reflective materials in a short wavelength range.

In an exemplary embodiment, the color compensation materials may include aluminum.

Exemplary embodiments of the invention provide a display device including an optical member, a display panel, and a plurality of light emitting units. The display panel is disposed on the optical member and the plurality of light emitting units is disposed under the optical member.

The optical member includes a diffusion layer and a plurality of reflective patterns disposed under the diffusion layer. The reflective patterns are disposed on a lower surface of the diffusion layer.

The diffusion layer includes a plurality of first portions corresponding to the plurality of light emitting units and a second portion disposed adjacent to the plurality of first portions.

The reflective patterns are disposed in the plurality of first portions and include a first base material and reflective materials dispersed in the first base material to reflect a light provided from the plurality of light emitting units.

According to the above, the plurality of first portions of the reflectivity control layer, which are overlapped with the plurality of light emitting units, receive the greater amount of the light from the plurality of light emitting units than the second portion of the reflectivity control layer. The plurality of first portions of the reflectivity control layer includes the greater amount of the reflective materials than the amount of the reflective materials contained in the second portion when the first and second portions respectively represent a unit area having a predetermined size.

The plurality of first portions of the reflectivity control layer reflects the greater amount of the light than the amount of the light reflected from the second portion. The light reflected by the plurality of first portions is re-incident to the second portion. Accordingly, the amount of the light passing through the plurality of first portions of the reflectivity control layer becomes similar to the amount of the light passing through the second portion of the reflectivity control layer. Thus, the optical member may provide the light of uniform amount to the display panel regardless of the first and second portions.

The reflective materials have different absorptances in accordance with wavelengths. The reflective materials have the light absorptance higher in the long wavelength range than that in the short wavelength range. The reflectivity control layer further includes the color compensation materials having the light absorptance higher than that of the reflective materials in the long wavelength range and lower than that of the reflective materials in the short wavelength range. The reflectivity control layer may provide the light, which is not shifted to specific wavelengths, to the display panel.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
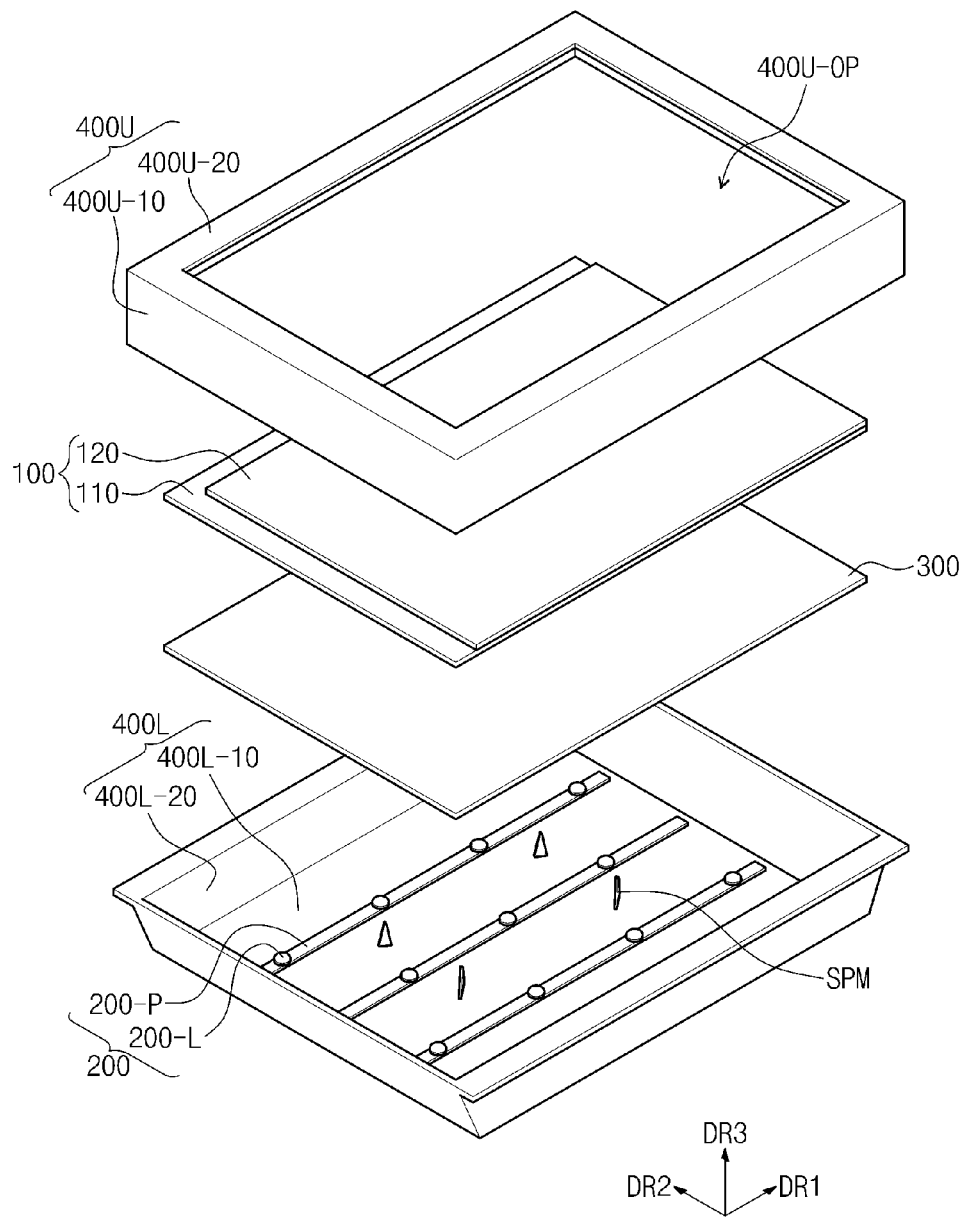
FIG. 1 is an exploded perspective view showing an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is an exploded perspective view showing a display device according to an exemplary embodiment of the invention.

Referring to FIG. 1, a display device includes a display panel 100, a light emitting unit 200, an optical member 300, and protective members 400L and 400U. The light emitting unit 200 may be provided in a plural number. In the illustrated exemplary embodiment in FIG. 1, three light emitting units 200 are shown. However, the invention is not limited thereto, and less or more than three light emitting units 200 may be provided.

The display panel 100 receives a light from the light emitting unit 200 and displays an image. In exemplary embodiments, the display panel 100 may be a transmissive type display panel or a transflective type display panel, such as a liquid crystal display ("LCD") panel, an electrophoretic display panel, an electrowetting display panel, etc. However, the invention is not limited thereto, and the display panel 100 may be various other types of display panel.

In the illustrated exemplary embodiment, the LCD panel will be described as the display panel 100. The LCD panel includes a first substrate 110, a second substrate 120 facing the first substrate and a liquid crystal layer (not shown) interposed between the first substrate 110 and the second substrate 120. The LCD panel includes a display area and a peripheral area surrounding the display area. The image is displayed in the display area and not displayed in the peripheral area disposed adjacent to the display area when viewed in a plan view. The LCD panel includes a plurality of pixels arranged in the display area.

The light emitting units 200 are disposed under the display panel 100 to provide the light to the display panel 100. Each of the light emitting units 200 includes a plurality of light emitting devices 200-L, e.g., a point light source, and a circuit board 200-P that apply electrical signals to the light emitting devices 200-L. The circuit board 200-P includes wirings to transmit the electrical signals.

Each of the light emitting devices 200-L may be a light emitting diode ("LED"). The light emitting units 200 are configured to include the light emitting devices 200-L in different numbers. As shown in FIG. 1, each of two light emitting units 200 includes four light emitting devices 200-L and one light emitting unit 200 disposed between the two light emitting units 200 includes three light emitting devices 200-L.

The light emitting devices 200-L are arranged in a first direction DR1. The light emitting units 200 are arranged in a second direction DR2 crossing the first direction DR1. The circuit board 200-P is extended in the first direction DR1.

Although not shown in figures, the display device may further include a main circuit board connected to the light emitting units 200. The main circuit board includes dimming circuits disposed thereon. The light emitting devices 200-L are substantially simultaneously turned off or independently turned off.

The optical member 300 is disposed under the display panel 100 and on the light emitting units 200. The optical member 300 receives the light from the light emitting units 200. The optical member 300 improves properties of the light and provides the light to the display panel 100. In an exemplary embodiment, the optical member 300 diffuses the light from the light emitting units 200, for example. The optical member 300 will be described in detail later.

The display panel 100 may further include a prism sheet (not shown) or a protective sheet (not shown) disposed between the optical member 300 and the display panel 100. The prism sheet collects the light provided from the optical member 300 in a direction substantially perpendicular to a plane of the display panel 100 disposed thereon. The protective sheet is disposed on the prism sheet to effectively prevent the prism sheet from being damaged.

The protective members 400L and 400U include a first protective member 400L disposed under the light emitting units 200 and a second protective member 400U disposed on the display panel 100. The first protective member 400L and the second protective member 400U are coupled to each other to accommodate the display panel 100, the light emitting unit 200 and the optical member 300 therein. In an exemplary embodiment, the first and second protective members 400L and 400U may include a metal or plastic material.

The first protective member 400L accommodates the light emitting units 200 therein. The first protective member 400L includes a bottom portion 400L-10 and a plurality of sidewall portions 400L-20 bent and extended from edges of the bottom portion 400L-10. In the illustrated exemplary embodiment, the bottom portion 400L-10 has a rectangular shape and the first protective member 400L includes four sidewall portions. However, the invention is not limited thereto, and the bottom portion 400L-10 may have various other types of shapes.

The light emitting units 200 are mounted on the bottom portion 400L-10. In addition, a reflective sheet (not shown) may be disposed on the bottom portion 400L-10. The reflective sheet exposes the light emitting devices 200-L and covers the circuit board 200-P. According to another exemplary embodiments, the bottom portion 400L-10 may be coated with a reflective material.

The second protective member 400U is disposed on the display panel 100 to cover an edge of the display panel 100. The second protective member 400U is provided with an opening 400U-OP through which the image passes. The opening 400U-OP corresponds to the display area of the display panel 100.

In the illustrated exemplary embodiment, the second protective member 400U has a rectangular frame shape when viewed in a plan view. The second protective member 400U is divided into four parts. The four parts are integrally provided with each other or assembled to each other. Each of the four parts includes a sidewall portion 400U-10 and a front surface portion 400U-20 bent from the sidewall portion 400U-10. The opening 400U-OP is defined by the front surface portions 400U-20 of the four parts. However, the invention is not limited thereto, and the second protective member 400U may have various other types of shapes.

In addition, the display device may further include an optical member supporter SPM. The optical member supporter SPM is disposed under the optical member 300 to support the optical member 300. The optical member supporter SPM may be provided in a plural number.

Figure 2A:
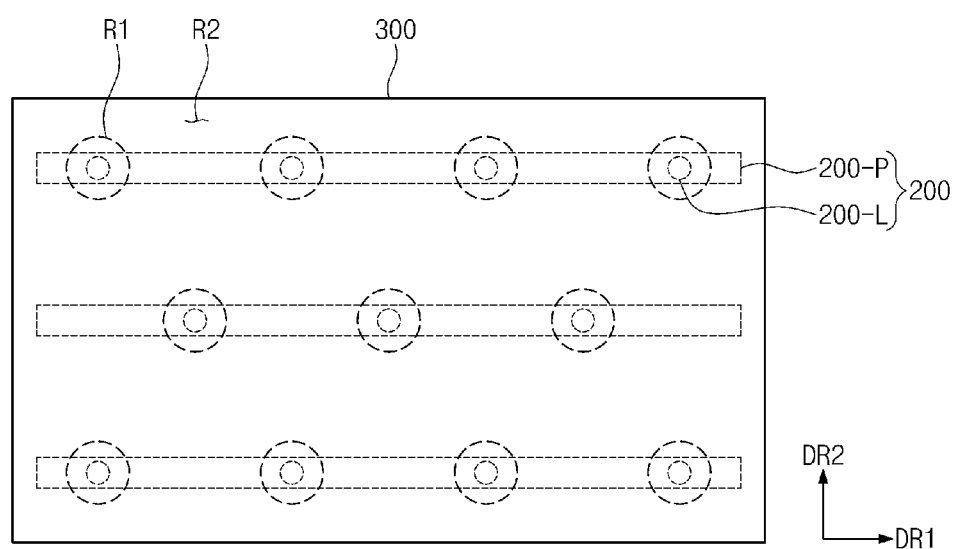
FIGS. 2A and 2B are plan views showing an exemplary embodiment of a portion of a display device according to the invention.
Figure 2B:
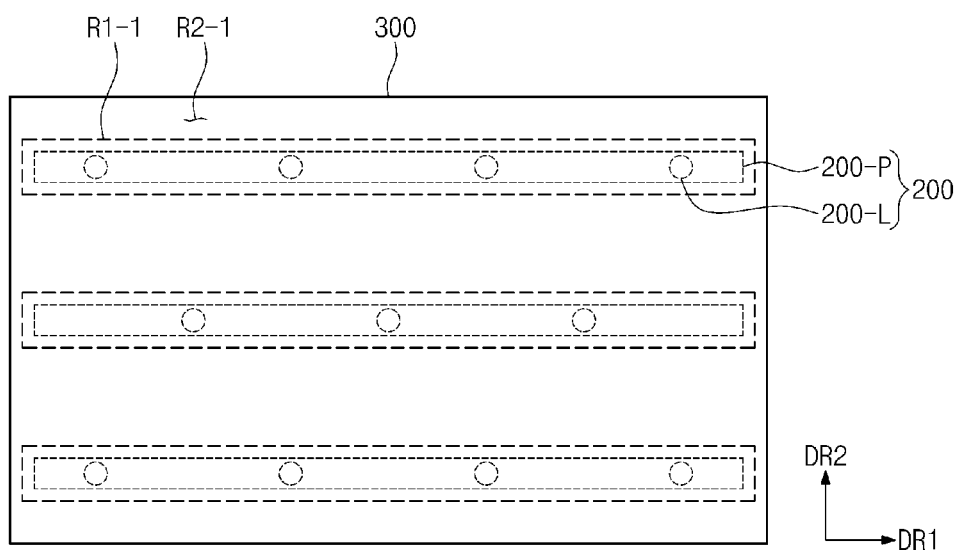
Figure 3:
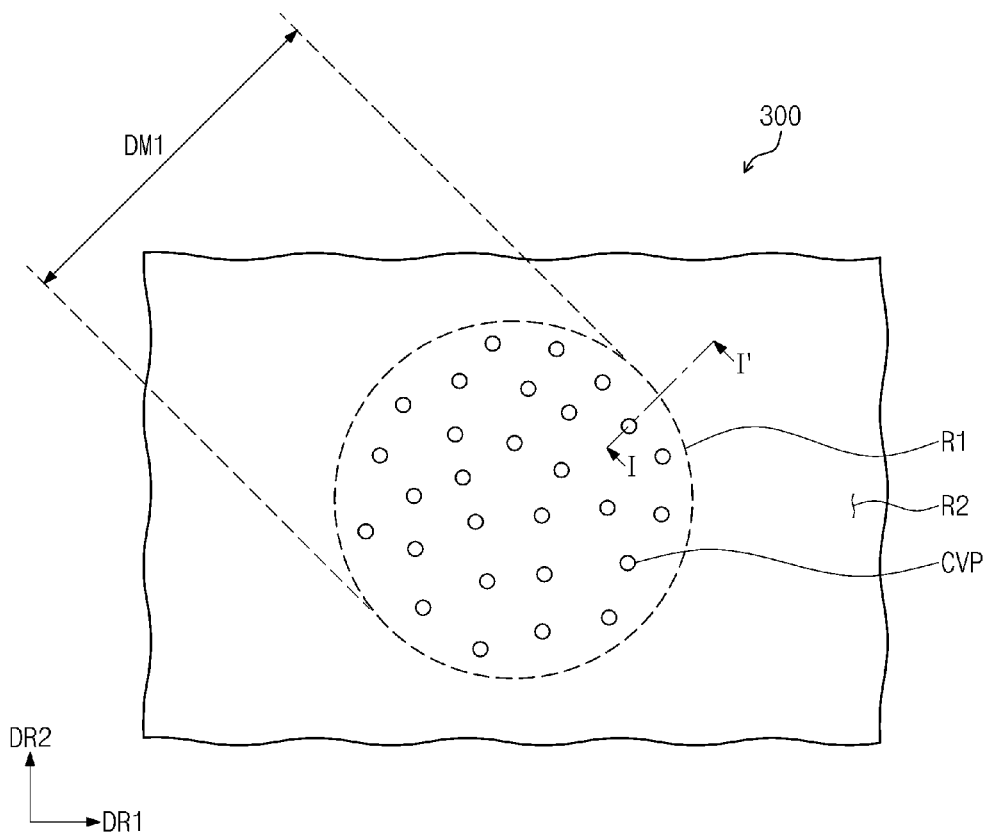
FIG. 3 is a partially enlarged plan view showing an exemplary embodiment of a portion of an optical member according to the invention.
Figure 4:
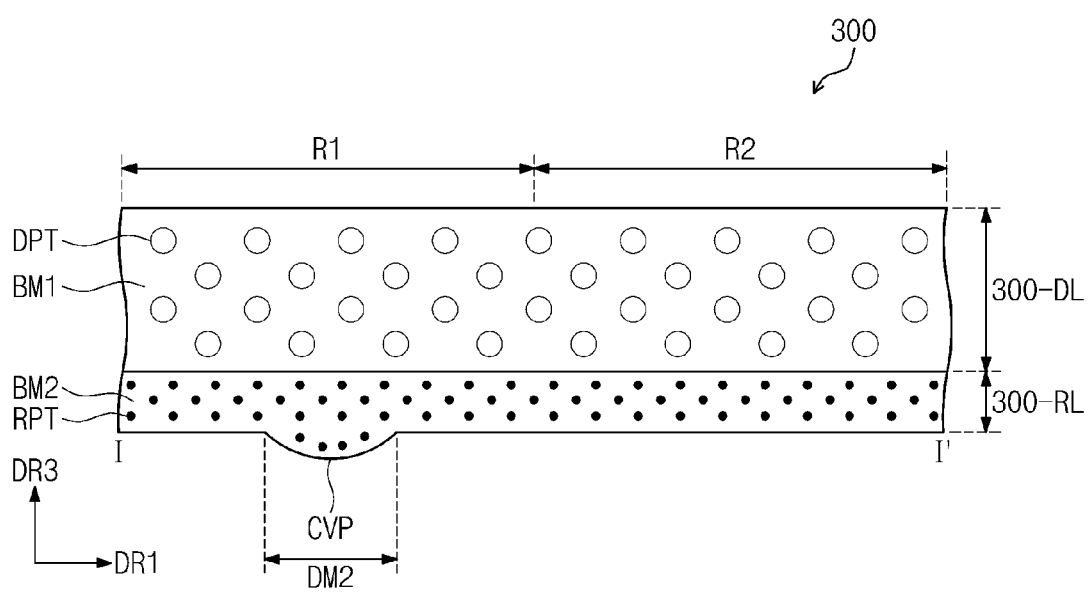
FIG. 4 is a cross-sectional view showing an exemplary embodiment of a portion of an optical member according to the invention.

FIGS. 2A and 2B are plan views showing a portion of the display device shown in FIG. 1, FIG. 3 is a partially enlarged plan view showing a portion of an optical member according to an exemplary embodiment of the invention, and FIG. 4 is a cross-sectional view showing a portion of an optical member according to an exemplary embodiment of the invention.

FIG. 3 shows one first area of plural first areas shown in FIG. 2A and FIG. 4 shows the cross-sectional view taken along line I-I' of FIG. 3.

Referring to FIGS. 2A and 2B, the optical member 300 includes the first areas R1 and R1-1, and second areas R2 and R2-1 respectively adjacent to the first areas R1 and R1-1. The first areas R1 and R1-1 have a light reflectance higher than that of the second areas R2 and R2-1. The light reflected from the first areas R1 and R1-1 is re-reflected by the first protective member 400L or the reflective sheet disposed on the bottom portion 400L-10 of the first protective member 400L, and then incident to the second areas R2 and R2-1.

As shown in FIG. 2A, the first areas R1 are corresponding to the light emitting devices 200-L. That is, the first areas R1 are disposed to overlap with the light emitting devices 200-L in a one-to-one correspondence. The light emitting devices 200-L are completely overlapped with a corresponding first area R1 of the first areas R1.

As shown in FIG. 2B, each of the first areas R1-1 is disposed to overlap with the light emitting devices 200-L. Each of the first areas R1-1 is completely overlapped with the light emitting devices 200-L and the circuit board 200-P, which are included in a corresponding light emitting unit 200 of the light emitting units 200.

Referring to FIGS. 3 and 4, the optical member 300 includes a diffusion layer 300-DL and a reflectivity control layer 300-RL. The reflectivity control layer 300-RL is disposed under the diffusion layer 300-DL in a thickness direction DR3 (hereinafter, also referred to as third direction) of the display device.

The diffusion layer 300-DL includes a first base material BM1 and diffusion materials DPT dispersed in the first base material BM1. The diffusion materials DPT may be uniformly dispersed in the first base material BM1. Each of the diffusion materials DPT dispersed in the first base material BM1 has a particle shape.

The light incident to the diffusion materials DPT is scattered. Due to the light scattering effect, an amount of the light traveling to the display panel 100 is larger than an amount of the light provided to the diffusion layer 300-DL.

The first base material BM1 includes a transparent plastic resin. In an exemplary embodiment, the first base material BM1 may include a polycarbonate resin, for example. In an exemplary embodiment, the diffusion materials DPT include silicon dioxide ($SiO_2$). When a combination of the first base material BM1 and the diffusion material DPT is extruded, the diffusion layer 300-DL may be provided.

The reflectivity control layer 300-RL includes a second base material BM2 and reflective materials RPT dispersed in the second base material BM2. The reflective materials RPT are uniformly dispersed in the second base material BM2. Each of the reflective materials RPT dispersed in the second base material BM2 may have a particle shape.

The reflectivity control layer 300-RL reflects a portion of the light provided from the light emitting devices 200-L, absorbs the other portion of the light provided from the light emitting devices 200-L, and transmits the other portion of the light provided from the light emitting devices 200-L.

In an exemplary embodiment, the second base material BM2 includes a transparent plastic resin, e.g., polycarbonate resin. In an exemplary embodiment, the reflective materials RPT include at least one of titanium dioxide ($TiO_2$) and barium sulfate ($BaSO_4$). In an exemplary embodiment, the reflectivity control layer 300-RL includes about 3 wt % to about 10 wt % of the reflective materials RPT to have a specific transmittance. The reflectivity control layer 300-RL is provided by extruding a combination of the second base material BM2 and the reflective materials DPT.

Each of the diffusion layer 300-DL and the reflectivity control layer 300-RL may further include a functional additive, e.g., an UV-stabilizing agent or a heat-resistance reinforcing additive.

When the extruded combination of the first base material BM1 and the diffusion materials DPT and the extruded combination of the second base material BM2 and the reflective materials RPT are substantially simultaneously entered into between two rollers, the diffusion layer 300-DL and the reflectivity control layer 300-RL are attached to each other, thereby forming the optical member 300. One of the two rollers may have concave patterns or convex patterns. Due to the concave patterns or the convex patterns of the one roller, convex patterns or concave patterns are disposed on the reflectivity control layer 300-RL. The patterns provided on the reflectivity control layer 300-RL will be described in detail later.

According to another exemplary embodiment, a method of manufacturing the optical member 300 includes providing the diffusion layer 300-DL by using an extrusion scheme, coating a reflective solution on the diffusion layer 300-DL, and drying the coating layer. The reflective solution includes a solvent, the second base material BM2, and the reflective materials RPT dispersed in the solvent. Before the coating layer is completely dried, the convex patterns or the concave patterns may be disposed on the coating layer using the roller having the concave patterns or the convex patterns.

A portion (hereinafter, also referred to as first portion) of the reflectivity control layer 300-RL disposed in the first area R1 includes a greater amount of the reflective materials RPT than that of the other portion (hereinafter, also referred to as second portion) of the reflectivity control layer 300-RL disposed in the second area R2 when the first and second portions respectively represent a unit area having a predetermined size. Since the first area R1 of the optical member 300 is overlapped with the light emitting unit 200, the first area R1 receives the light more than the light provided to the second area R2.

The first portion of the reflectivity control layer 300-RL, which includes a larger amount of the reflective materials that that of the second portion, reflects a greater amount of the light than that of the second portion of the reflectivity control layer 300-R. The light reflected from the first portion of the reflectivity control layer 300-RL is re-reflected by the first protective member 400L or the reflective sheet, and then the re-reflected light is incident to the second portion of the reflectivity control layer 300-RL. Thus, the amount of the light passing through the first portion of the reflectivity control layer 300-RL becomes similar to that of the light passing through the second portion when the first and second portions respectively represent the unit area having a predetermined size.

The first portion of the reflectivity control layer 300-RL may have a thickness thicker than a thickness of the second portion of the reflectivity control layer 300-RL. In this case, it is sufficient that an average thickness of the first portion of the reflectivity control layer 300-RL is larger than an average thickness of the second portion of the reflectivity control layer 300-RL. The thickness of the first and second portions of the reflectivity control layer 300-RL may be adjusted by the concave patterns or the convex patterns.

As shown in FIGS. 3 and 4, the first areas R1 corresponding to the light emitting devices 200-L in a one-to-one correspondence have a circular shape when viewed in a plan view. Each of the first areas R1 has a diameter DM1 greater than a diameter of each of the light emitting devices 200-L. In an exemplary embodiment, each of the first areas R1 may have the diameter DM1 of about 80 millimeters (mm) to about 120 mm, but the shape of the first areas R1 should not be limited to the circular shape and the diameter DM1.

The first portion of the reflectivity control layer 300-RL includes the convex patterns CVP. The convex patterns CVP are protruded from a lower surface of the optical member 300. The convex patterns CVP increase the average thickness of the first area R1 of the reflectivity control layer 300-RL and the amount of the reflective materials RPT in the first area R1.

Each of the convex patterns CVP may have a semicircular shape and have a diameter DM2 equal to or smaller than about 500 micrometers (μm). Preferably, each of the convex patterns CVP has the diameter DM2 of about 200 μm to about 300 μm, but the shape of the convex patterns CVP should not be limited to the semi-circular and the diameter DM2.

Figure 5:
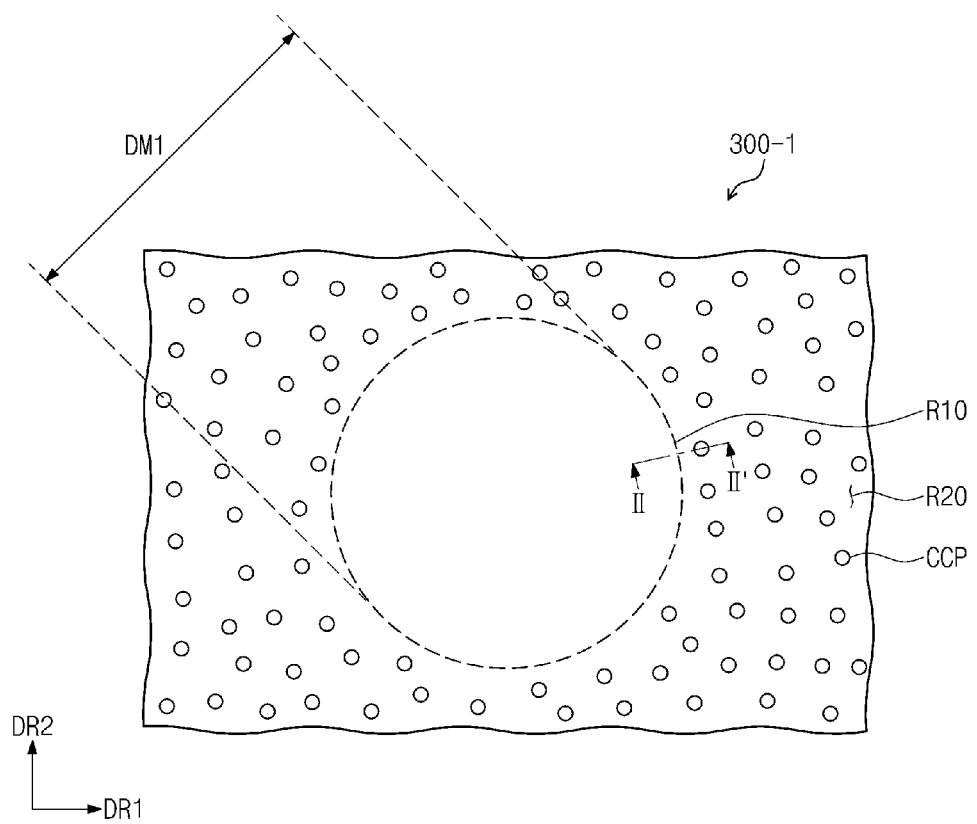
FIG. 5 is a partially enlarged plan view showing an exemplary embodiment of a portion of an optical member according to the invention.
Figure 6:
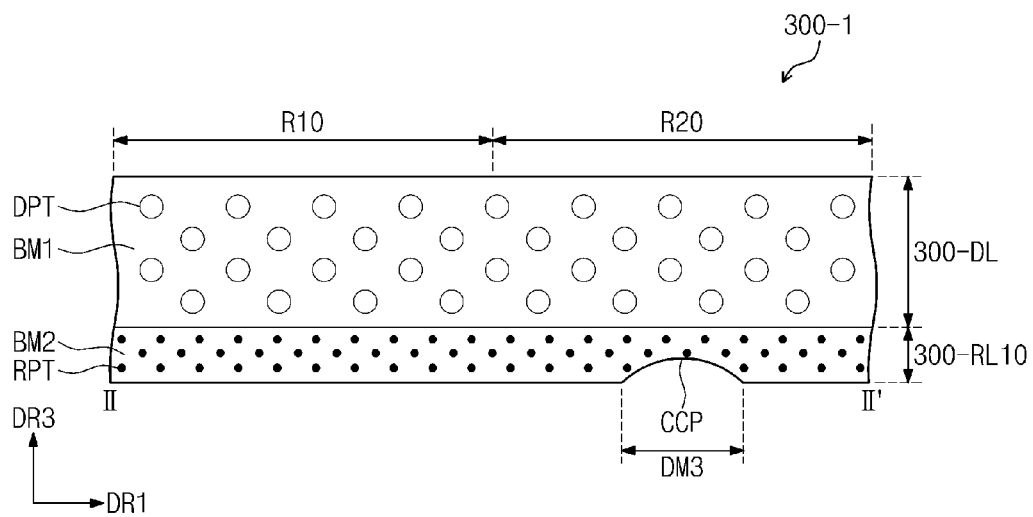
FIG. 6 is a cross-sectional view showing an exemplary embodiment of a portion of an optical member according to the invention.

FIG. 5 is a partially enlarged plan view showing a portion of an optical member according to an exemplary embodiment of the invention and FIG. 6 is a cross-sectional view showing a portion of an optical member according to an exemplary embodiment of the invention. FIG. 5 shows an area corresponding to that shown in FIG. 3 and FIG. 6 shows the cross-sectional view taken along line II-II' of FIG. 5. In FIGS. 5 and 6, the same reference numerals denote the same elements in FIGS. 1 to 4, and thus detailed descriptions of the same elements will be omitted.

Referring to FIGS. 5 and 6, an optical member 300-1 includes a diffusion layer 300-DL and a reflectivity control layer 300-RL10. The reflectivity control layer 300-RL10 is disposed under the diffusion layer 300-DL in the third direction DR3.

The diffusion layer 300-DL includes a first base material BM1 and diffusion materials DPT dispersed in the first base material BM1. The reflectivity control layer 300-RL10 includes a second base material BM2 and reflective materials RPT dispersed in the second base material BM2.

The first portion of the reflectivity control layer 300-RL10 disposed in a first area R10 includes a greater amount of the reflective materials RPT than that of a second portion of the reflectivity control layer 300-RL10 disposed in the second area R20 when the first and second portions respectively represent the unit area having a predetermined size.

The second portion of the reflectivity control layer 300-RL10 corresponding to the second area R20 includes concave patterns CCP. The concave patterns CCP are provided by recessing a lower surface of the optical member 300-1. In the exemplary embodiment shown in FIG. 6, the diffusion layer 300-DL is not exposed through the concave patterns CCP, but the invention is not limited thereto, and the diffusion layer 300-DL may be exposed depending on a depth of the concave patterns CCP.

The concave patterns CCP decreases the average thickness of the second area of the reflectivity control layer 300-RL10 and the amount of the reflective materials RPT dispersed in the second area R20. Due to the decrease of the reflective materials RPT dispersed in the second area R20, the amount of the reflective materials RPT dispersed in the first area R10 increases.

Each of the concave patterns CCP has a diameter DM3 of about 500 μm. Preferably, each of the concave patterns CCP has the diameter DM3 of about 200 μm to about 300 μm, but the shape of the concave patterns CCP should not be limited thereto or thereby.

The first portion of the reflectivity control layer 300-RL10 disposed in the first area R10 reflects a greater amount of the light than the second portion of the reflectivity control layer 300-RL10 disposed in the second area R20. The light reflected from the first portion is re-reflected by the first protective member 400L or the reflective sheet, and then the re-reflected light is incident to the second portion. Therefore, the optical member 300-1 may provide the light of uniform amount to the display panel 100 regardless of the first area R10 and the second area R20.

According to another exemplary embodiment, the reflectivity control layer 300-RL10 may further include the convex patterns CVP disposed in the first portion.

Figure 7:
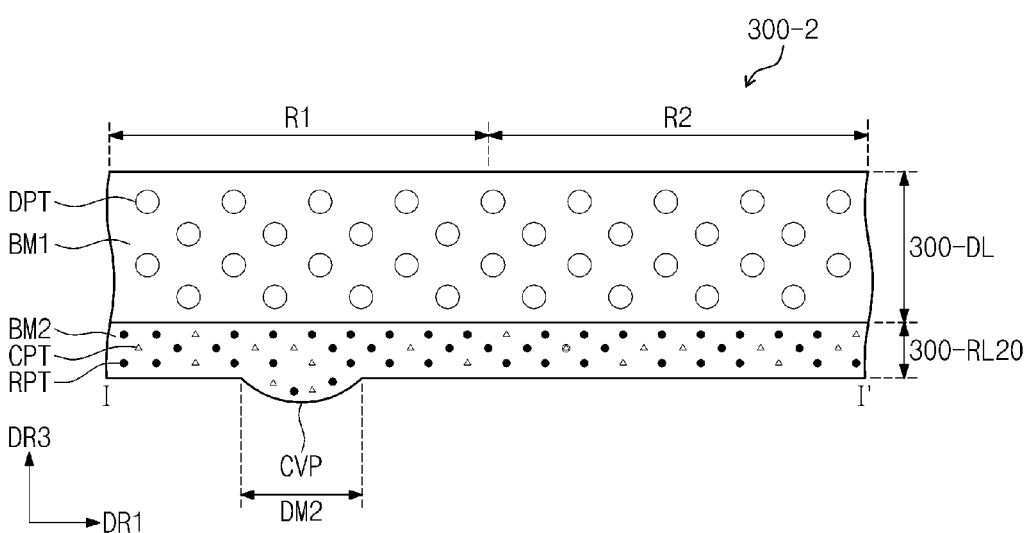
FIG. 7 is a cross-sectional view showing an exemplary embodiment of a portion of an optical member according to the invention.
Figure 8:
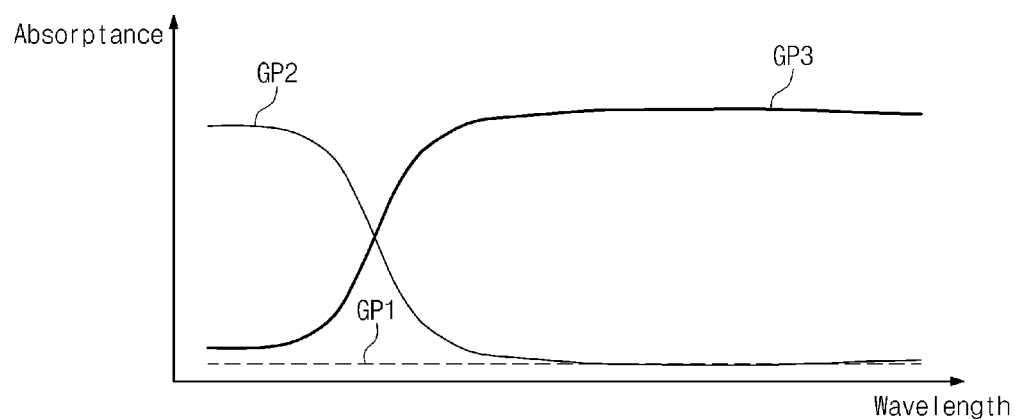
FIG. 8 is a graph showing a light absorptance versus a wavelength of light in accordance with a material used for an optical member.
Figure 9:
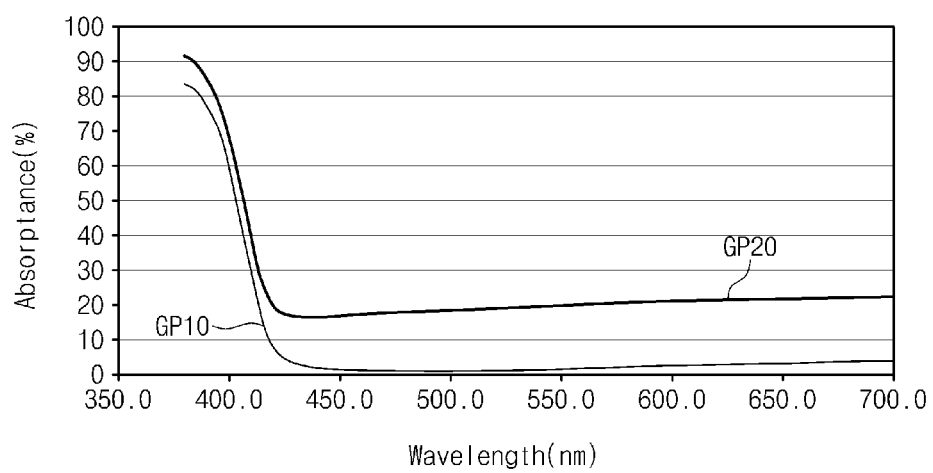
FIG. 9 is a graph showing a light absorptance versus a wavelength of light and a light transmissivity versus a wavelength of light of an exemplary embodiment of an optical member according to the invention.

FIG. 7 is a cross-sectional view showing a portion of an optical member according to an exemplary embodiment of the invention, FIG. 8 is a graph showing a light absorptance in accordance with a material used for an optical member, and FIG. 9 is a graph showing a light absorptance of an optical member versus a wavelength of light and a light transmissivity of an optical member versus a wavelength of light according to exemplary embodiments of the invention. FIG. 7 shows the cross-sectional view corresponding to that shown in FIG. 4. In FIGS. 7 to 9, the same reference numerals denote the same elements in FIGS. 1 to 6, and thus detailed descriptions of the same elements will be omitted.

Referring to FIG. 7, an optical member 300-2 includes a diffusion layer 300-DL and a reflectivity control layer 300-RL20. The diffusion layer 300-DL includes a first base material BM1 and diffusion materials DPT dispersed in the first base material BM1.

The reflectivity control layer 300-RL20 includes a second base material BM2, reflective materials RPT dispersed in the second base material BM2, and a color compensation material CPT dispersed in the second base material BM2. Each of the reflective materials RPT and each of the color compensation materials CPT, which are dispersed in the second base material BM2, have a particle shape.

The reflectivity control layer 300-RL20 reflects a portion of the light provided from the light emitting devices 200-L, absorbs the other portion of the light provided from the light emitting devices 200-L, and transmits the other portion of the light provided from the light emitting devices 200-L. In particular, the reflective materials RPT reflect the light incident to the reflectivity control layer 300-RL20. The reflective materials RPT reflect most of the incident light, but absorb a portion of the incident light. The reflective materials RPT absorb a greater amount of the light having a specific wavelength of the incident light.

In an exemplary embodiment, the reflective materials RPT absorb a greater amount of the light having a short wavelength than the light having a long wavelength. Accordingly, a color of the light passing through the reflectivity control layer including titanium dioxide, for example, is shifted to the long wavelength.

The color compensation materials CPT effectively prevent the color of the light passing through the reflectivity control layer from being shifted. The color compensation materials CPT absorb a greater amount of the light than the reflective material RPT, which has a wavelength different from that of the light absorbed by the reflective material RPT. The color compensation materials CPT absorb a greater amount of the light having the long wavelength than the light having the short wavelength. In an exemplary embodiment, the color compensation materials CPT may include aluminum, for example.

FIG. 8 is a graph showing the light absorptance in accordance with the material included in the reflectivity control layer. In FIG. 8, a first graph GP1 represents an ideal light absorptance of the reflectivity control layer. According to the first graph GP1, the absorptance is low and uniform regardless of the wavelength of the incident light.

A second graph GP2 represents the light absorptance of the reflectivity control layer including titanium dioxide. According to the second graph GP2, the light absorptance becomes high in the short wavelength range. The light passing through the reflectivity control layer having the light absorptance as shown by the second graph GP2 is reddish.

A third graph GP3 represents the light absorptance of the reflectivity control layer including aluminum. According to the third graph GP3, the light absorptance becomes high in the long wavelength range. The light passing through the reflectivity control layer having the light absorptance as shown by the third graph GP3 is bluish.

A fourth graph GP10 shown in FIG. 9A represents the light absorptance of the reflectivity control layer including titanium dioxide, and a fifth graph GP20 shown in FIG. 9A represents the light absorptance of the reflectivity control layer including titanium dioxide and aluminum.

The fourth graph GP10 and the fifth graph GP20 have similar light absorptance in the wavelength range equal to or smaller than about 430 nm. According to the fourth and fifth graphs GP10 and GP20, the reflectivity control layer including the titanium dioxide and aluminum absorbs about 20% greater light than the reflectivity control layer including the titanium dioxide in the wavelength range equal to or greater than about 430 nm. Thus, the light passing through the reflectivity control layer having the light absorptance shown by the fourth graph GP10 is more reddish than the light passing through the reflectivity control layer having the light absorptance shown by the fifth graph GP20. In other words, the color compensation materials CPT, which has the light absorptance higher than that of the reflective materials RPT in the long wavelength range and lower than that of the reflective materials RPT in the short wavelength range, relieves the color shift of the light passing through the reflectivity control layer.

Although not shown in FIGS. 5 and 6, the reflectivity control layer 300-RL10 of the optical member 300-1 described with reference to FIGS. 5 and 6 may further include the color compensation materials CPT.

Figure 10:
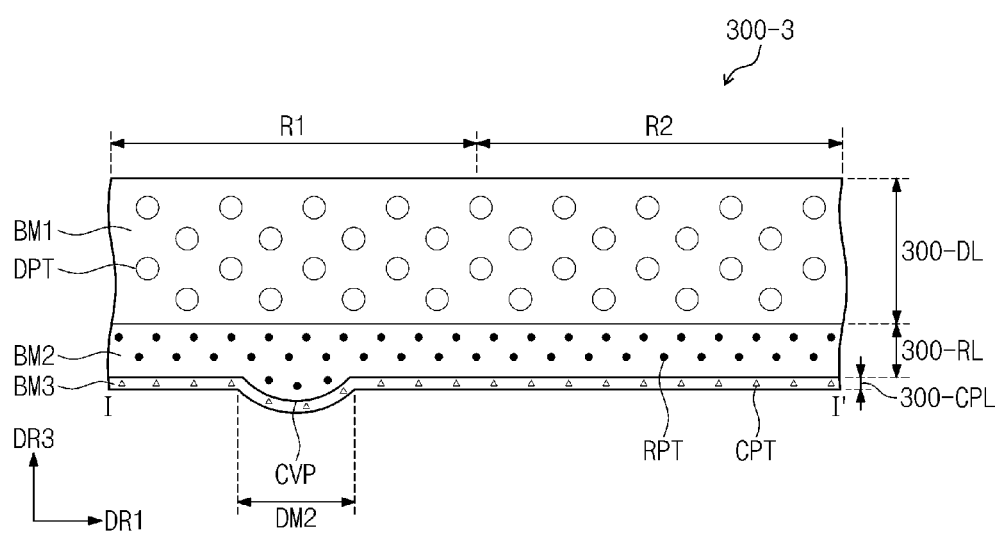
FIG. 10 is a cross-sectional view showing an exemplary embodiment of a portion of an optical member according to the invention.

FIG. 10 is a cross-sectional view showing a portion of an optical member according to an exemplary embodiment of the invention. FIG. 10 shows the cross-sectional view corresponding to that shown in FIG. 4. In FIG. 10, the same reference numerals denote the same elements in FIGS. 1 to 9, and thus detailed descriptions of the same elements will be omitted.

Referring to FIG. 10, an optical member 300-3 includes a diffusion layer 300-DL, a reflectivity control layer 300RL, and a color compensation layer 300-CPL. The diffusion layer 300-DL includes a first base material BM1 and diffusion materials DPT dispersed in the first base material BM1. The reflectivity control layer 300-RL includes a second base material BM2 and reflective materials RPT dispersed in the second base material BM2.

The color compensation layer 300-CPL includes a third base material BM3 and color compensation materials CPT dispersed in the third base material BM3. In an exemplary embodiment, the third base material BM3 includes a transparent plastic resin, e.g., polycarbonate resin. The color compensation materials CPT are the same as the color compensation materials CPT described with reference to FIG. 7, and thus detailed description of the color compensation materials CPT will be omitted.

The color compensation layer 300-CPL is disposed under the reflectivity control layer 300-RL in the third direction DR3. In an exemplary embodiment, the color compensation layer 300-CPL may be disposed on one surface of the reflectivity control layer 300-RL coupled to the diffusion layer 300-DL according to an extrusion method. In an exemplary embodiment, the color compensation layer 300-CPL may be disposed on the one surface of the reflectivity control layer 300-RL according to a coating and drying method.

In another exemplary embodiment, the color compensation layer 300-CPL may be disposed between the diffusion layer 300-DL and the reflectivity control layer 300-RL. According to an extrusion method, the reflectivity control layer 300-RL may be coupled to the color compensation layer 300-CPL after the color compensation layer 300-CPL is coupled to the diffusion layer 300-DL. However, the invention is not limited thereto and the method of providing the optical member 300-3 should not be limited thereto or thereby.

The color compensation layer 300-CPL including the color compensation materials CPT, which has the light absorptance higher than that of the reflective materials RPT in the long wavelength range and lower than that of the reflective materials RPT in the short wavelength range, thereby relieves the color shift of the light passing through the reflectivity control layer 300-RL.

Although not shown in FIGS. 5 and 6, the optical member 300-1 described with reference to FIGS. 5 and 6 may further include the color compensation layer 300-CPL.

Figure 11:
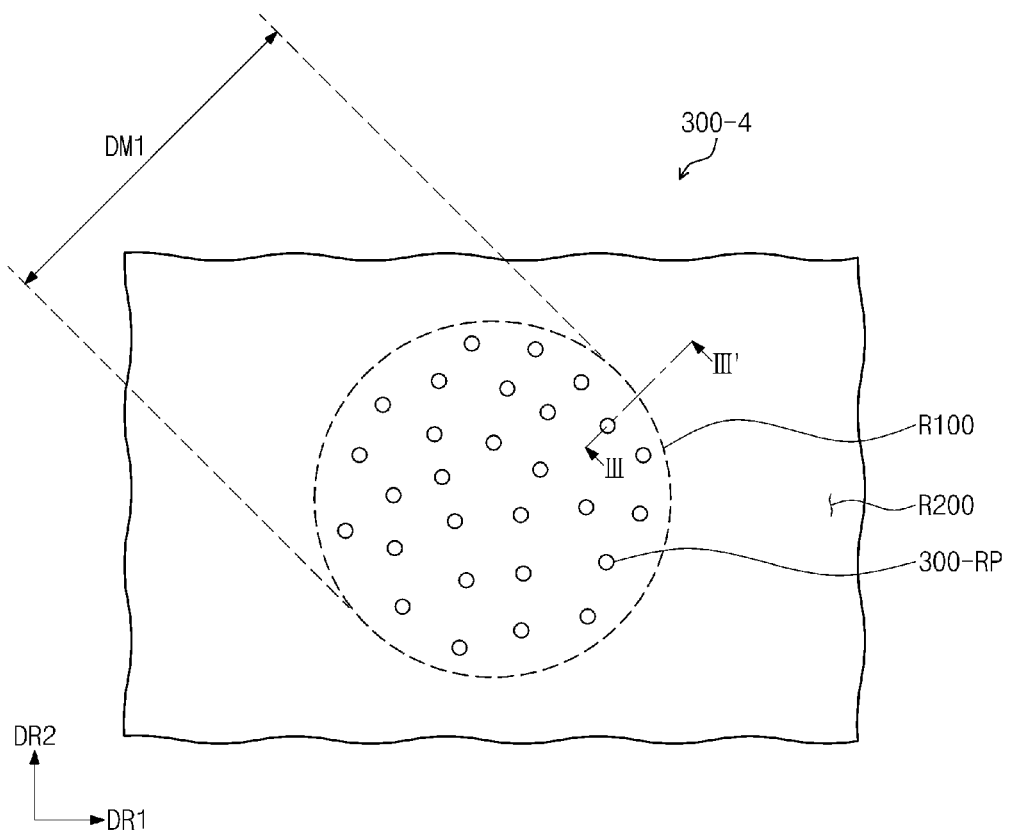
FIG. 11 is a partially enlarged plan view showing an exemplary embodiment of an optical member according to the invention.
Figure 12:
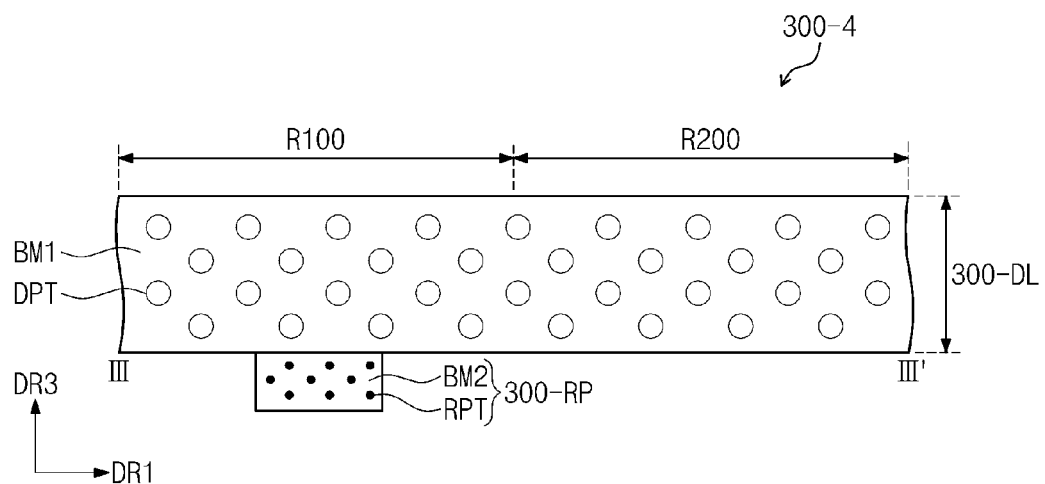
FIG. 12 is a cross-sectional view showing an exemplary embodiment of a portion of an optical member according to the invention.

FIG. 11 is a partially enlarged plan view showing an optical member according to an exemplary embodiment of the invention and FIG. 12 is a cross-sectional view showing a portion of an optical member according to an exemplary embodiment of the invention. FIG. 11 shows the partially enlarged plan view corresponding to that shown in FIG. 3 and FIG. 12 shows the cross-sectional view taken along line of FIG. 11. In FIGS. 11 and 12, the same reference numerals denote the same elements in FIGS. 1 to 10, and thus detailed descriptions of the same elements will be omitted.

Referring to FIGS. 11 and 12, an optical member 300-4 includes a plurality of first areas R100 and a second area R200 disposed adjacent to the first areas R100. FIG. 11 shows one first area R100 of the plurality of first areas R100. The first area R100 is overlapped with the light emitting device 200-L (refer to FIG. 2A) and the second area R200 is not overlapped with the light emitting device 200-L.

The optical member 300-4 includes a diffusion layer 300-DL and reflective patterns 300-RP. The reflective patterns 300-RP are disposed in the first area R100. The reflective patterns 300-RP are disposed under the diffusion layer 300-DL in the third direction DR3 of the display device. The reflective patterns 300-RP are protruded from a lower surface of the diffusion layer 300-DL.

The diffusion layer 300-DL includes a first base material BM1 and diffusion materials DPT dispersed in the first base material BM1. In an exemplary embodiment, the first base material BM1 includes a transparent plastic resin, e.g., polycarbonate resin. In an exemplary embodiment, the diffusion materials DPT include silicon dioxide.

The reflective patterns 300-RP include a second base material BM2 and reflective materials RPT dispersed in the second base material BM2. In an exemplary embodiment, the second base material BM2 includes a plastic resin. In an exemplary embodiment, the reflective materials RPT include at least one of titanium dioxide and barium sulfate.

A method of providing the optical member 300-4 includes providing the diffusion layer 300-DL using an extrusion scheme, printing reflective solution on the diffusion layer 300-DL to provide patterns, and drying the printed patterns. The reflective solution includes solvent, the second base material BM2 dissolved in the solvent, and the reflective materials RPT dispersed in the solvent.

In an exemplary embodiment, the second base material BM2 may include an acrylic resin to improve the printing efficiency. In an exemplary embodiment, the dried reflective patterns 300-RP may include about 45 wt % to about 55 wt % of the reflective materials RPT and about 55 wt % to about 45 wt % of the acrylic resin.

The reflective patterns 300-RP reflect a portion of the light provided from the light emitting devices 200-L, absorb the other portion of the light provided from the light emitting devices 200-L, and transmit the other portion of the light provided from the light emitting devices 200-L. The reflective materials RPT reflect the light incident to the first area R100. The first area R100 receives a greater amount of the light than that of the light provided to the second area R200. The light reflected from the first area R100 is re-reflected by the protective member 400L (refer to FIG. 1) or the reflective sheet, and then the re-reflected light is incident to the second area R200. Thus, the amount of the light passing through a portion of the diffusion layer 300-DL disposed in the second area R200 becomes similar to the amount of the light passing through the other portion of the diffusion layer 300-DL disposed in the first area R100.

According to another exemplary embodiments, reflective patterns different from the reflective patterns 300-RP may be disposed in the second area R200. In this case, the reflective patterns disposed in the second area R200 are dispersed in a density lower than that of the reflective patterns 300-RP disposed in the first area R100. In addition, each of the reflective patterns disposed in the second area R200 has smaller area and volume than those of the reflective patterns 300-RP.

Figure 13:
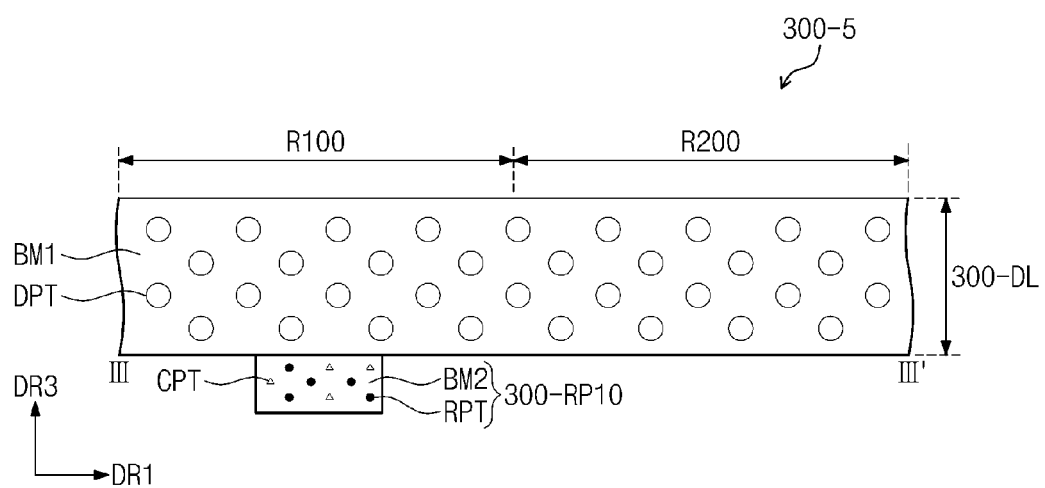
FIG. 13 is a cross-sectional view showing an exemplary embodiment of a portion of an optical member according to the invention.
Figure 14:
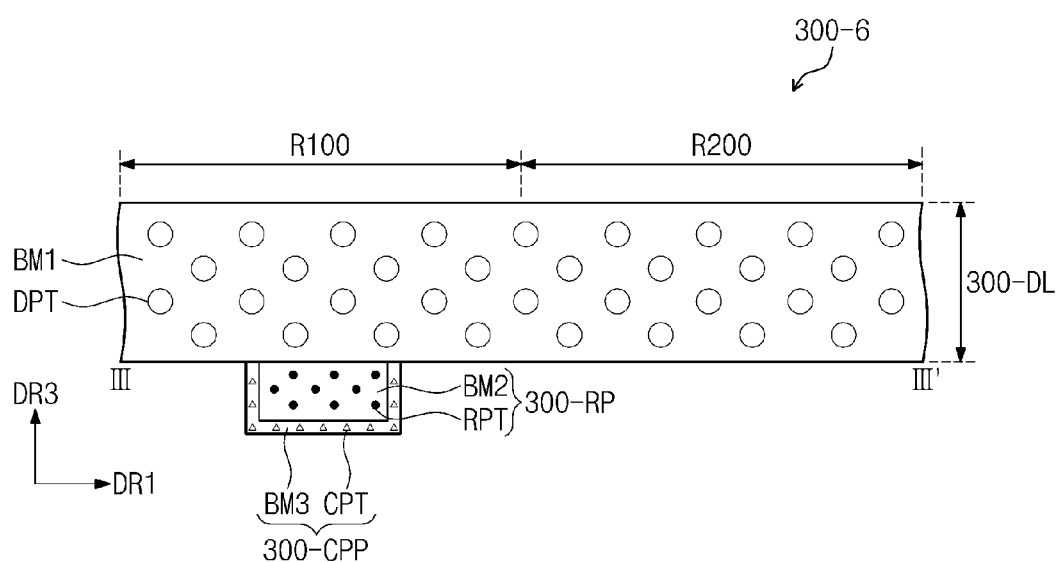
FIG. 14 is a cross-sectional view showing an exemplary embodiment of a portion of an optical member according to the invention.

FIG. 13 is a cross-sectional view showing a portion of an optical member according to an exemplary embodiment of the invention and FIG. 14 is a cross-sectional view showing a portion of an optical member according to an exemplary embodiment of the invention. In FIGS. 13 and 14, the same reference numerals denote the same elements in FIGS. 1 to 12, and thus detailed descriptions of the same elements will be omitted.

Referring to FIG. 13, an optical member 300-5 includes a diffusion layer 300-DL and reflective patterns 300-RP10. The reflective patterns 300-RP10 are protruded from the lower surface of the diffusion layer 300-DL.

The diffusion layer 300-DL includes a first base material BM1 and diffusion materials DPT dispersed in the first base material BM1. The reflective patterns 300-RP10 include a second base material BM2, reflective materials RPT dispersed in the second base material BM2, and color compensation materials CPT.

The color compensation materials CPT have the same function as that of the color compensation materials shown in FIGS. 7 to 9. The color compensation materials CPT effectively prevent the color of the light passing through the optical member 300-5 from being shifted. In an exemplary embodiment, the reflective patterns 300-RP may include about 45 wt % to about 55 wt % of the reflective materials RPT, about 5 wt % to about 15 wt % of the color compensation materials CPT, and about 30 wt % to about 50 wt % of the acrylic resin.

Referring to FIG. 14, an optical member 300-6 includes a diffusion layer 300-DL, reflective patterns 300-RP, and color compensation patterns 300-CCP. The reflective patterns 300-RP are protruded from the lower surface of the diffusion layer 300-DL.

The diffusion layer 300-DL includes a first base material BM1 and diffusion materials DPT dispersed in the first base material BM1. The reflective patterns 300-RP include a second base material BM2 and reflective materials RPT dispersed in the second base material BM2.

The color compensation patterns CPP include a third base material BM3 and color compensation materials CPT dispersed in the third base material BM3. The color compensation patterns CPT shown in FIG. 14 are overlapped with the reflective patterns 300-RP. The color compensation patterns 300-CCP may surround the reflective patterns 300-RP.

The color compensation patterns 300-CCP have the same function as that of the color compensation layer 300-CPL described with reference to FIG. 10. The color compensation patterns CPP effectively prevent the color of the light passing through the optical member 300-6 from being shifted.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display device comprising:
an optical member;
a display panel disposed on the optical member; and
a light emitting unit disposed under the optical member, the optical member comprising:
a diffusion layer; and
a reflectivity control layer which is disposed under the diffusion layer, including a first base material and reflective materials dispersed in the first base material, wherein the reflective control layer comprises a first portion corresponding to the light emitting unit and a second portion adjacent to the first portion, and the first portion comprises a greater amount of the reflective materials than the second portion, when the first portion and the second portion respectively represent a unit area having a predetermined size.

2. The display device of claim 1, wherein the first portion of the reflectivity control layer has a thickness greater than a thickness of the second portion of the reflectivity control layer.

3. The display device of claim 2, wherein the first portion comprises convex patterns.

4. The display device of claim 3, wherein each of the convex patterns has a diameter of about 200 micrometers to about 300 micrometers.

5. The display device of claim 4, wherein the first portion has a diameter of about 80 millimeters to about 120 millimeters.

6. The display device of claim 2, wherein the second portion comprises concave patterns.

7. The display device of claim 6, wherein each of the concave patterns has a diameter of about 200 micrometers to about 300 micrometer.

8. The display device of claim 1, wherein the reflective materials comprise at least one of titanium dioxide and barium sulfate.

9. The display device of claim 8, wherein the diffusion layer comprises a second base material and diffusion materials dispersed in the second base material.

10. The display device of claim 9, wherein the diffusion materials comprise silicon dioxide.

11. The display device of claim 9, wherein at least one of the first base material and the second base material comprises a polycarbonate resin.

12. The display device of claim 11, wherein the reflectivity control layer further includes color compensation materials having a light absorptance higher than that of the reflective materials in a long wavelength range and lower than that of the reflective materials in a short wavelength range.

13. The display device of claim 12, wherein the color compensation materials comprise aluminum.

14. The display device of claim 1, wherein
the optical member further comprises a color compensation layer including a third base material and color compensation materials dispersed in the third base material, and
the color compensation materials have a light absorptance higher than that of the reflective materials in a long wavelength range and lower than that of the reflective materials in a short wavelength range.

15. The display device of claim 14, wherein the color compensation materials comprise aluminum.

16. A display device comprising:
an optical member;
a display panel disposed on the optical member; and
a light emitting unit disposed under the optical member, the optical member comprising:
a diffusion layer which includes a first portion corresponding to the light emitting unit and a second portion adjacent to the first portions; and
a plurality of reflective patterns which is overlapped with the first portion, and includes a first base material and reflective materials dispersed in the first base material.

17. The display device of claim 16, wherein the reflective materials comprise at least one of titanium dioxide and barium sulfate.

18. The display device of claim 17, wherein the plurality of reflective patterns further includes color compensation materials having a light absorptance higher than that of the reflective materials in a long wavelength range and lower than that of the reflective materials in a short wavelength range.

19. The display device of claim 16, wherein
the optical member further comprises a plurality of color compensation patterns including a second base material and color compensation materials dispersed in the second base material, and
the color compensation materials have a light absorptance higher than that of the reflective materials in a long wavelength range and lower than that of the reflective materials in a short wavelength range.

20. The display device of claim 19, wherein the color compensation materials comprise aluminum.

* * * * *